INVENTORS
CURT P. HEROLD
SAM D. STAHLEY
BY
ATTORNEYS

INVENTORS
CURT P. HEROLD
SAM D. STAHLEY
BY
ATTORNEYS

INVENTORS
CURT P. HEROLD
SAM D. STAHLEY
ATTORNEYS

May 16, 1967  C. P. HEROLD ET AL  3,319,979
QUICK ATTACH AND RELEASE FLUID COUPLING ASSEMBLY
Filed April 3, 1964  4 Sheets-Sheet 4

INVENTORS,
CURT P. HEROLD,
SAM D. STAHLEY
BY
ATTORNEYS

United States Patent Office 3,319,979
Patented May 16, 1967

3,319,979
QUICK ATTACH AND RELEASE FLUID
COUPLING ASSEMBLY
Curt P. Herold and Sam D. Stahley, Huntsville, Ala.,
assignors to the United States of America as represented by the Administrator of the National Aeronautics and Space Administration
Filed Apr. 3, 1964, Ser. No. 357,337
5 Claims. (Cl. 285—24)

The invention described herein may be manufactured and used by or for the Government of the United States of America for governmental purposes without the payment of any royalties thereon or therefor.

This invention relates in general to a quick-release coupling for a fluid transporting system, and more particularly to a quick-release coupling for use in fueling a rocket or space vehicle with a cryogenic fuel.

As is well known, most large launch vehicles and rockets in use today are powered by rocket engines which utilize a mixture of various liquids as a propellant. Since most of these liquids are not only difficult to handle and store, but are also extremely dangerous, their transfer and use on the large scale involved has given rise to certain problems that were heretofore unknown or of little concern in the fluid handling art. Perhaps the most pressing of these problems deals with transferring the liquids, and especially those that are of a cryogenic type, from a ground based storage system to the fuel tanks of the launch vehicle. In view of the fact that these liquids are extremely dangerous and any leakage thereof could result in a catastrophic explosion, it is absolutely imperative that there be no leaks or other unintentional escape of these liquid propellants during the tanking operation. This means that each coupling in the fluid transporting system, as well as all the pumps, hoses, etc., must be constructed in such a manner as to minimize the probability that a leak may occur.

It has been found to be relatively easy to construct all of the fluid transporting systems in such a manner as to insure a leak proof operation with the exception of the coupling used to connect the system to the fuel tank inlet port. This is true because all of the fluid transporting system, with the exception of this coupling, can be of the more or less permanent type since there is no decoupling problems involved just prior to or immediately after the ignition of the launch vehicles engines. However, in view of the fact that the fluid transporting system must be decoupled from the fuel tanks of the launch vehicle prior to or just after its "lift-off" or "flight," the coupling at the inlet port of the tanks must be of the type which can not only be readily connected to the port to give a leak free joint but must be easily and quickly removable therefrom.

This quick coupling and revovable feature of the fluid coupler is particularly important in present day liquid powdered launch vehicles since one of the following two fueling and release procedures is usually followed. In the first instance the fueling or "capping-off" operation is continued until just a few seconds before ignition of the vehicle engines occurs at which time the signal to decouple or release the coupling from the vehicle is given. If the coupling fails to fall away a "hold" on ignition of the engines takes place until the coupling is freed. This obviously results in a slippage in the launch time of the vehicle which can, and often does, force the cancellation of the launch. Should a hold occur in the launch of the vehicle after the coupling is released, then the fuel tanks of the vehicle must again be capped-off to replace the fuel that has been lost during the hold or the entire mission will have to be cancelled. This means that the fluid coupling must be recoupled to the fuel tanks of the launch vehicle which in the past, has been extremely time consuming and, in most instances, impossible using existing fluid couplings due to the icing condition that occurs on these couplings.

To eliminate the possibility that a hold will occur after the fluid coupling has been released and cannot, due to the icing condition present, be reconnected to the vehicle thus forcing a cancelling of the launch, it is now common practice to institute the decoupling operation after engine ignition has occurred and the launch vehicle has already separated from the launch pad and is in free flight. Since the launch vehicle is several inches above the launch pad at the time the decoupling signal is given, it is obvious that the point of "no-return" has passed and the vehicle has been committed to flight. This means, therefore, that a decoupling of the coupling from the vehicle must occur or serious complications will result. In the past, failure of the coupling to release from the vehicle has resulted in the coupling being ripped from the ground fuel system and carried into flight by the vehicle, or positions of the vehicle tanking system being seriously damaged. These results have in turn often caused a partial or complete failure of the launch mission.

The so called "quick-releasable" couplings that have heretofore been used for attaching fluid transporting systems to the fuel tanks of a launch vehicle generally consist of various versions of the well known cylindrical slide fitting. These fittings normally include a lip and/or compression seal to prevent fluid leakage. However, the use of these type fittings have left much to be desired. For example, it is extremely difficult to properly align such cylindrical fitting since the tolerances involved leaves little or no room for "play" and this, in turn, leads to a sealing problem. This is particularly true where cryogenic fluids are being handled since they cause a noticeable metal shrinkage thus increasing the probability that a leak may develop around the seal.

In addition, difficulties have been encountered in obtaining coupling disconnect or release because of the precise alignment requirements associated with the use of two cylindrical mating surfaces. In fact it has been found extremely difficult to maintain an acceptable alignment between two such surfaces with the equipment presently being employed at rocket launch installations. The icing conditions also to be found where cryogenic fluids are being transported further contributes to the functional problems associated with prior quick-release coupling devices. In few, if any, instances has it been found practical or possible to recouple these coupling devices once they have been released.

According to the present invention it has been found that a quick release coupling, which is particularly well adapted for use in fueling rocket powered launch vehicle with a cryogenic fluid, can be produced that overcomes the hereinabove mentioned difficulties. This quick-release coupling includes two sealing surfaces or halves, one of which is in the form of a spherical surface while the other is conical in shape. The use of mating spherical and conical sealing surfaces not only produces a positive leak-proof seal, but also permits a certain degree of flexibility in alignment thereof since the longitudinal and vertical centerlines of the coupling halves do not have to be parallel to effect an adequate seal. A cylindrical seal gasket having a sharp or pointed leading edge is positioned between the sealing surfaces for forming a fluid tight sealing surface having a minimum contact area. This limited area of contact not only assures a leak-free seal that can be readily re-established after a disconnect, but also serves to prevent "freezing on" or sticking together of the coupling during icing conditions. A quick-release mechanism and pivot bracket are employed for securing the two halves of the coupling together and to insure that they separate instantaneously upon receiving a release command. To initially seat the two halves together, a movable threaded cylindrical hub is utilized with a bellows arrangement being provided for applying further pressure to the seal joint once pressurized fluid begins to flow through the coupling.

Accordingly, the primary object of this invention is to provide a leak free coupling device that can be both readily coupled together and released.

Another object of this invention is to provide a quick-release coupling having a releasable mechanism and pivot bracket for securing the coupling halves together.

Yet another object of this invention is to provide a quick-release coupling that will provide a leak free joint under adverse conditions of misalignment, position changes, severe vibrations, rapid flow and pressure changes, and various degrees of material contraction and icing caused by extreme temperature variations occurring during the conveying of cryogenic fluids.

A further object of this invention is to provide a quick-release coupling having one of the sealing surfaces thereof formed in a cone-shape and the other surface in the form of a sphere with a knife edge seal gasket located therebetween for eliminating leaks and sticking together of the sealing surfaces.

A still further object of this invention is to provide a quick-release coupling having a seating mechanism for initially seating the two halves of the coupling together in a fluid tight manner, and a pressure operated mechanism for increasing this seating pressure as fluid flows through the coupling.

These and further objects and advantages of this invention will become more apparent upon reference to the following specification, appended claims and drawings wherein:

In order that the construction, operation and use of this novel quick-release coupling can be better understood it will be described in connection with the fueling of a launch vehicle for which use it was primarily designed. It is to be realized, however, that numerous other uses may be found for this novel coupling structure. For example, a coupling constructed in accordance with this invention will give superior results when used in practically all fluid and gas handling systems where a releasable coupling is required.

Figure 1:
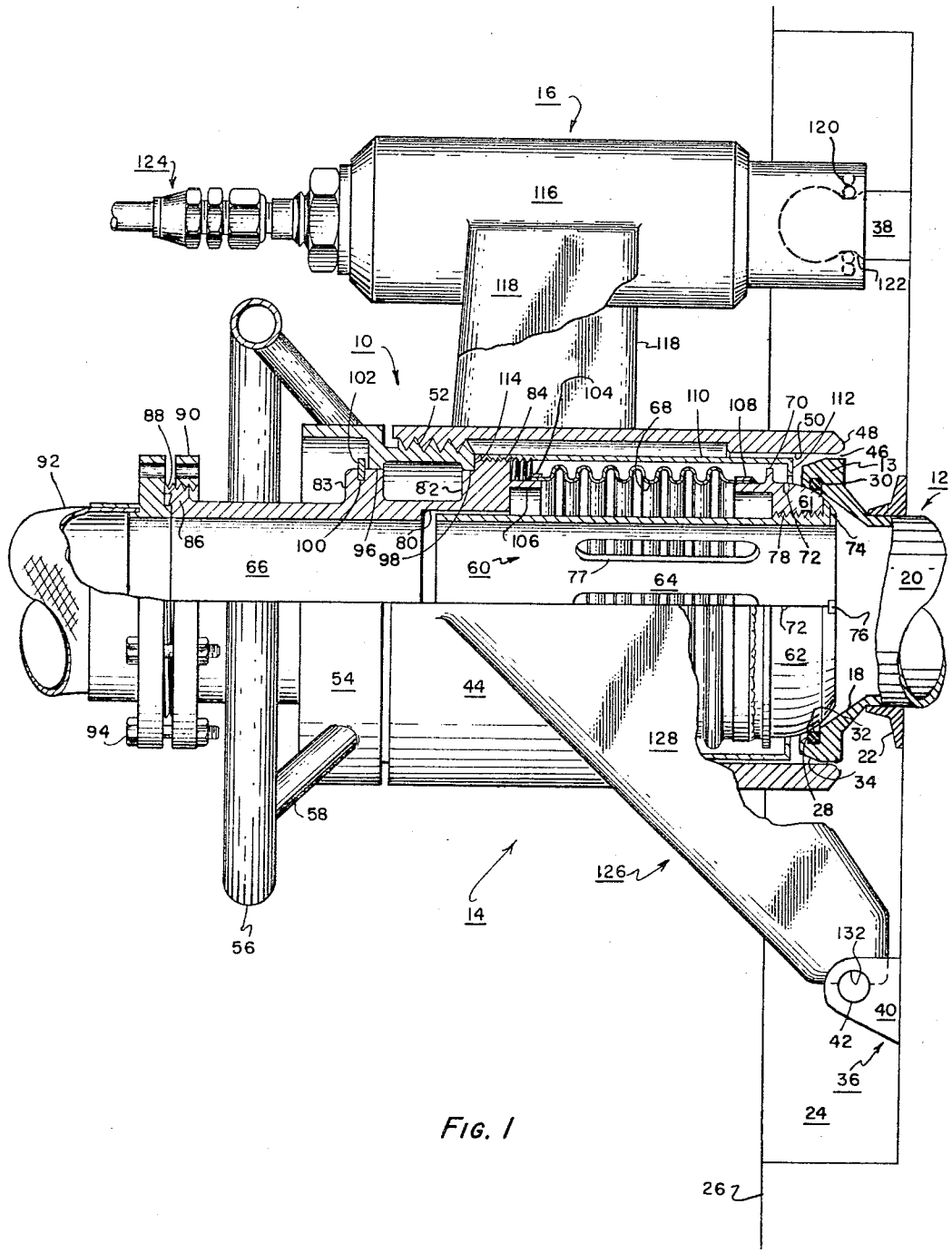
FIGURE 1 is an elevational view of a quick-release coupling in operating position with the top half thereof broken away to show various internal parts in cross section and in elevation.

With continued reference to the accompanying figures wherein like numerals designate similar parts throughout the various views, and with initial attention directed to FIGURE 1, reference numeral 10 generally designated a quick-release fluid coupling constructed in accordance with this invention. As can be seen from FIGURE 1, the coupling 10 can, for purposes of explaining the construction and operation thereof, be thought of as consisting of three sub-units. Namely, (1) the first half or female portion 12 of the coupler 10, (2) the second half or male portion 14, and (3) a quick attach and release securing mechanism 16 for clamping the two halves together.

As seen in FIGURE 1, the female portion 12 of the coupling 10 consists of an enlarged, funnel like port 13 that has an inner frusto-conical shaped surface 18 and which is secured by any suitable method, such as by weld or brazing, to the outer end of a fluid conductor or pipe 20 that leads to a fluid storage system. In the present instance the pipe 20 is an inlet pipe leading to the fuel tanks of a rocket powered launch vehicle of the Saturn V class and is attached by a ring 22 to the walls of a recess 24 formed on the outer periphery of the launch vehicle skin 26. The launch vehicle skin 26 serves as a support structure for the female portion 12. A groove or channel 28 is formed in the inner surface of the conical surface 18 near the leading edge thereof for receiving and holding a replaceable square ring seal 30 which is preferable of the non-metallic type for reducing the scarring and freezing together normally associated with sealing surfaces. The groove 28 and seal 30 coact together in such a manner as to present a pointed or knife edge 32 to the male portion 14 of the coupling for reasons that will be more fully explained hereinafter. Obviously the ring seal 30 can take other shapes as long as a knife edge sealing surface 32 is always formed and oriented so as to engage the male portion 14. For purposes of assisting in the alignment and interengagement of the two halves 12 and 14, the outer leading edge of the female portion 12 is gradually tapered at 34.

To assist in securing and holding the male portion 14 of the coupling 10 in place against the female portion 12 during a fueling operation, a bar support 36 is positioned in the recess 24 on one side of the female portion 12 while a grooved bolt or rod-like attachment 38 is located on the other side thereof. Since, in the present instance, it is desirable for the male portion 14 to be separate from the female portion 12 by gravitational forces when the securing mechanism 16 is actuated, the bar support 36 is located in the lower end of the recess 24. This bar support consists of brackets 40 secured to the walls of the recess 24 between which a rod 42 (see FIGURE 3) is suspended.

The male portion 14 of the coupling 10 consists of a hollow outer protective housing or support structure 44 having an open end 46 that is beveled or tapered along its inner edge 48 to facilitate alignment of the male and female halves of the coupling. The forward portion or length 50 of the internal cylindrical surface of the housing 44 is machined to provide a smooth contacting surface while the aft portion has internal threads 52 formed thereon. A cylindrical hub or sleeve 54 is attached to the housing 44 by having external threads which mesh with the internal threads 52, as shown in FIGURE 1. A hand wheel 56 is attached through radial arms or spokes 58 to the hub 54 so that rotation of the wheel in a counterclockwise direction will unthread the hub from the housing 44 while rotation of the wheel in a clockwise direction will thread the two together.

Located within the housing 44 is the male coupling assembly 60. This coupling assembly consists of a cylindrical seal ring 61 having a spherical seal surface 62 formed thereon, an inner telescoping sleeve 64, a tubular shaped adapter piece 66, and a tubular bellows arrangement 68.

The seal ring 61, besides having a flange or stop 70 formed around its outer periphery, has a plurality of indents 72 formed at spaced points therealong. The inner sleeve 64 of the male coupling assembly 60 has a turned up end portion 74 which is machined to the curvature of the seal surface 62 and has a plurality of wrench indents 76 formed therein. The end of the outer surface of the sleeve 64 is threaded at 78 to the ring 61. The indents 72 and 76 are for receiving and holding a tool used to tightly thread the ring 61 and inner sleeve 64 together to form a fluid tight assembly. Apertures 77 are provided in the inner sleeve 64 for permitting fluid to flow therethrough for reasons that will be more fully set forth later.

The adapter piece 66 is also of a cylindrical shape with the inside diameter of the forward section 80 being slightly larger than the remaining portion of the internal length. This forward section 80 is for telescopically accepting the external diameter of the inner sleeve 64 so that the sleeve 64 is free to slide in an axial direction and the internal surfaces of the adapter piece 66 and inner sleeve 64 form a smooth flow path having approximately the same inside diameter. The external surface of the adapter piece 66, though generally cylindrical in shape, has annular flanges 82, 83, and 86 of unequal diameter formed thereon. The forward or downstream flange 82 of adapter piece 66 is externally threaded at 84 while the rear or upstream flange 86 is externally threaded at 88 to accept the internally threaded lock ring 90. This lock ring 90 is coupled to a source of fluid through a hose connection 92 by a plurality of bolts 94 or other suitable means.

An annular shoulder 96 located on the external surface of the middle flange 83 of the adapter piece 66, along with the rear section 98 of the flange 82, acts as an internal rotational bearing surface for the hub 54. The annular shoulder 96 is also grooved around its entire circumference at point 100 to accept a C type retainer ring 102. This C ring prevents the hub 54 from sliding off the bearing surfaces and toward the rear of the male portion 14 as the hub 54 is unthreaded from the casing 44 or otherwise forced toward the rear of the coupling. Thus, rotation of the hand wheel in a counterclockwise direction will unscrew the hub 54 from the housing 44 and at the same time move the adapter piece 66 toward the rear of the coupling 10. The advantages of and uses for this movement of the adapter piece in reference to the housing 44 will be more fully explained hereinafter.

To complete the male coupling assembly 60, and thereby provide a leak free passage for the fluid from the hose connection 92 through the assembly to the female portion 12, an elastic, thin-walled corrugated pipe or bellows 68 is welded along its peripheral edge at 104 to the flange 106 of the adapter piece 66 and at 108 to the spherical seal surface 62. This bellows 68 not only serves as a sealing wall or enclosure, but when fluids under pressure are introduced into the system through the hose coupling 92, the fluids will flow through the apertures 77 of inner sleeve 64 into the area of the bellows thereby causing them to expand in an axial direction and move the ring 61 axially forward thus applying an additional sealing force to that already existing between the spherical seal surface 62 and the conical seal surface 18. As the internal pressure of the fluid increases this sealing force will also increase thereby giving rise to what can be termed an "opposing force" acting against the separation forces existing between the spherical seal surface 62 and conical surface 18 through the seal gasket 30. The presence of this opposing force produced by the expanding bellows is extremely important where cryogenic or liquefied gas is being pumped through the coupling since it cancels out the shrinkage or pulling away of the sealing surfaces from one another and the leak that would result therefrom.

The magnitude of the opposing force produced by the bellows 68 can easily be regulated or varied by simply changing the mean diameter or area of the bellows 68 if such adjustment is necessary or desirable. In any case, the area of the bellows 68 should exceed the area of the gasket seal 30 that is exposed to the pressure of the fluid flowing through the coupling 10 so that as fluid pressure increases the compressive forces applied by the bellows through the spherical seal surface 62 and gasket seal to the conical surface 18 increases at a greater rate than the separation forces being exerted between the spherical and conical surfaces at the gasket seal. This assures the forming of a leak-free coupling during the flow of fluids through the coupling 10 regardless of the variation in pressure that may occur therein.

An outer sleeve or cylinder 110 is positioned around the bellows 68 to, among other things, protect them from damage. This outer sleeve 110 has an internal lip 112 formed on one end thereof for both serving as an ice breaker during the coupling and de-coupling operation and as a catch for flange 70 during decoupling operations. Internal threads 114 are provided on the other end of the sleeve 110 for securing it to the flange 82 of the adapter piece 66.

Figure 3:
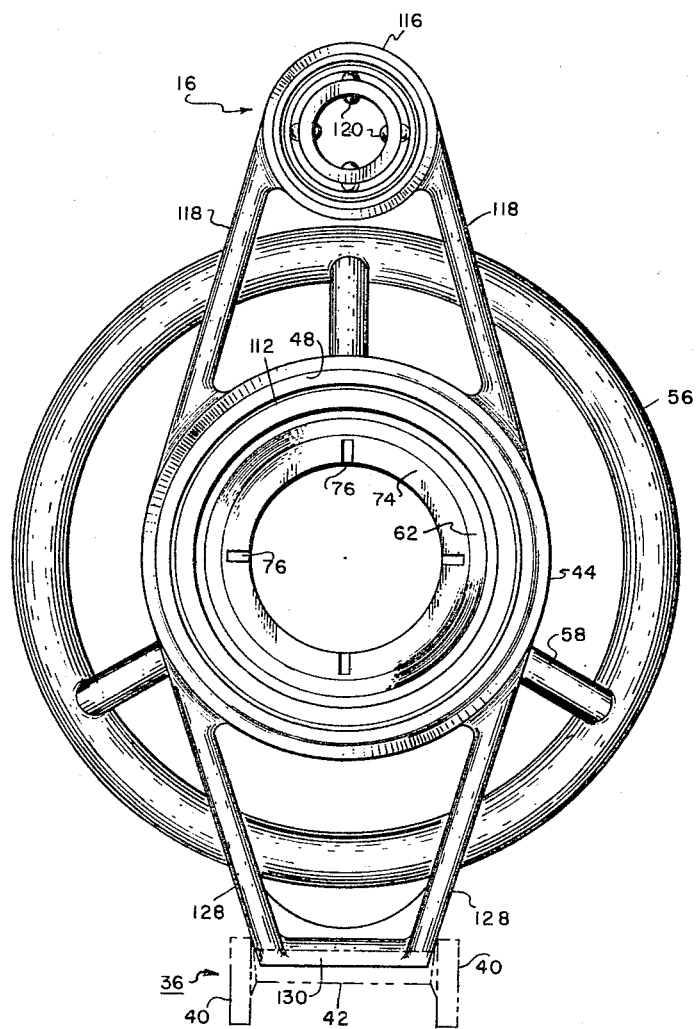
FIGURE 3 is an end view of the removable half of the coupling as viewed from the mating surface end.

The actuated portion of the securing mechanism 16 used for clamping the male portion 14 of the coupling 10 to the female portion 12 is housed within a cylindrically shaped enclosure 116 and is attached to the housing 44 of the male portion by a pair of arms 118 in a manner that is more clearly illustrated in FIGURE 3. The actuated portion of the quick attach and release mechanism itself is housed within the enclosure 116 and can be of any suitable type which is adapted for clamping and holding a grooved or knobbed rod such as 38 until a release signal is received. Preferable, however, the securing mechanism is of the general type disclosed in the United States application for Letters Patent, Ser. No. 353,634, by Adolf L. Herrmann and entitled "Locking Device." This type of attach and release mechanism utilizes a plurality of balls 120 which fall into and are wedged within a groove 122 (all of which is shown in broken lines in FIGURE 1) whenever the securing mechanism 16 is slipped over the rod 38. This wedging action by the balls 120 secures the mechanism 16 and rod 38 together thereby locking the male portion 14 against the female portion 12 until a suitable release signal, such as a pneumatic or mechanical force applied through a hose or cable 124, is presented to release the mechanism.

As will be readily apparent, a longitudinal centerline drawn through both the securing mechanism 16 and the male coupling housing 44 will be substantially parallel. This is to assure that an easy and proper coupling operation will occur when the two coupling halves 12 and 14 are initially positioned in an uncoupled, axially aligned relationship. It is to be realized, however, that the spherical sealing surface 62 seats against the conical sealing surface 18 along the same single annular area regardless of the alignment of the center line of these two sealing surfaces. In the case where the ring seal 30 is used, which is the preferred case, this annular area will be along the knife edge 32. From this it will be obvious that the longitudinal centerlines of the spherical and conical sealing surfaces need not be parallel but can in fact be "misaligned" to an appreciable extent without any adverse effect or leaks resulting therefrom.

Figure 5:
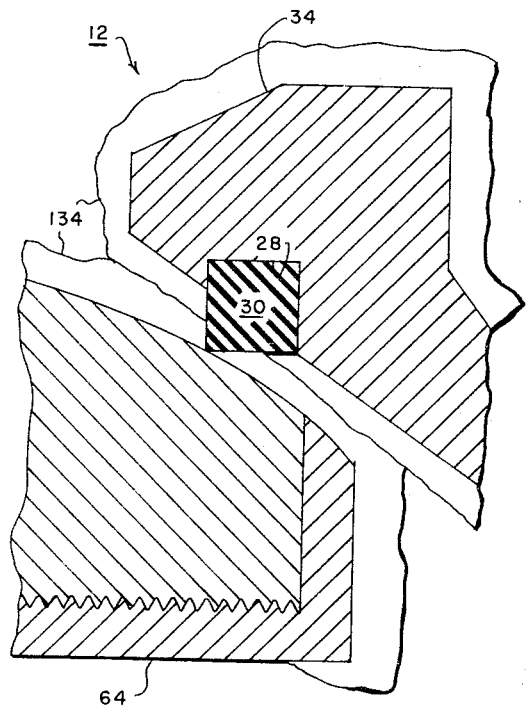
FIGURE 5 is a cross sectional view similar to FIG. 4 but showing the sealing surfaces mated together.
Figure 4:
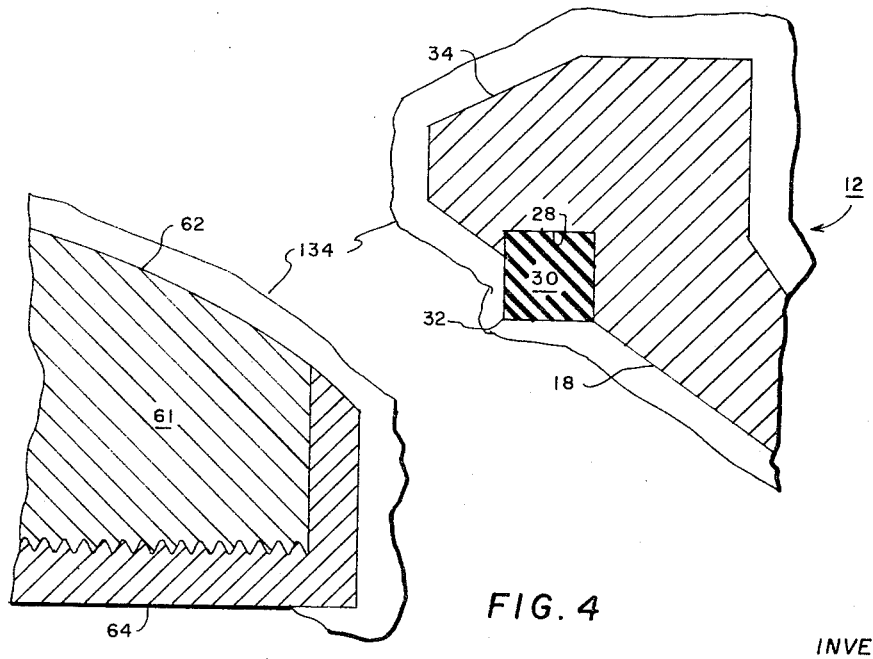
FIGURE 4 is a cross sectional view of the spherical and conical sealing surfaces showing the presence of ice thereon.

As illustrated in FIGURES 4 and 5, the use of a knife edge annular seal point not only helps prevent leakage around the coupling when it is first connected together, but permits it to be successfully recoupled any number of times even after icing of the parts has occurred. As mentioned hereinabove, this is a highly desirable feature for those launch systems which employ a decoupling operation prior to ignition of the rocket engines since, if the engines fail to function properly, the coupling may have to be reconnected to the vehicle. In such an instance both the female portion 12 and male 14 of the coupling will usually have a layer or coating of ice 134 formed over both the conical surface 18 and the spherical surface 62. However, as the two coupling portions are brought together, the knife edge point 32 of the seal ring 30 will present the only area of contact between the two surfaces which results in a very high pressure being produced over a very limited area of the ice. This concentrated pressure causes the ice to chip and/or melt until the point comes into contact with the surface 62 as illustrated in FIG. 5. If the surfaces 18 and 62 had been substantially parallel, as would be the case in a sleeve or ball socket joint, then the ice layers 134 formed on the surfaces would have engaged simultaneously over a large area thereby preventing any high pressure point from occurring and a proper sealing of the surfaces would not be established.

To support the weight of the male portion 14 of the coupling 10 and the associated weight of the accessories connected thereto, as well as to help secure the male portion in place and to assure that it separates or drops away correctly when released by the actuated portion of the securing mechanism 16, a yoke-like pivot bracket 126 consisting of two arms 128 is attached to the housing 44. The lower end of the arms 128 are joined together by a cross-brace 130 (see FIG. 3) which is provided with a V slot or groove 132 that is adapted to seat on and pivot about the rod 42 of the bar support 36. As is readily realized, this portion of the securing mechanism 16 forms a pivoting point at the lower extremity of the male coupling 14.

Figure 2:
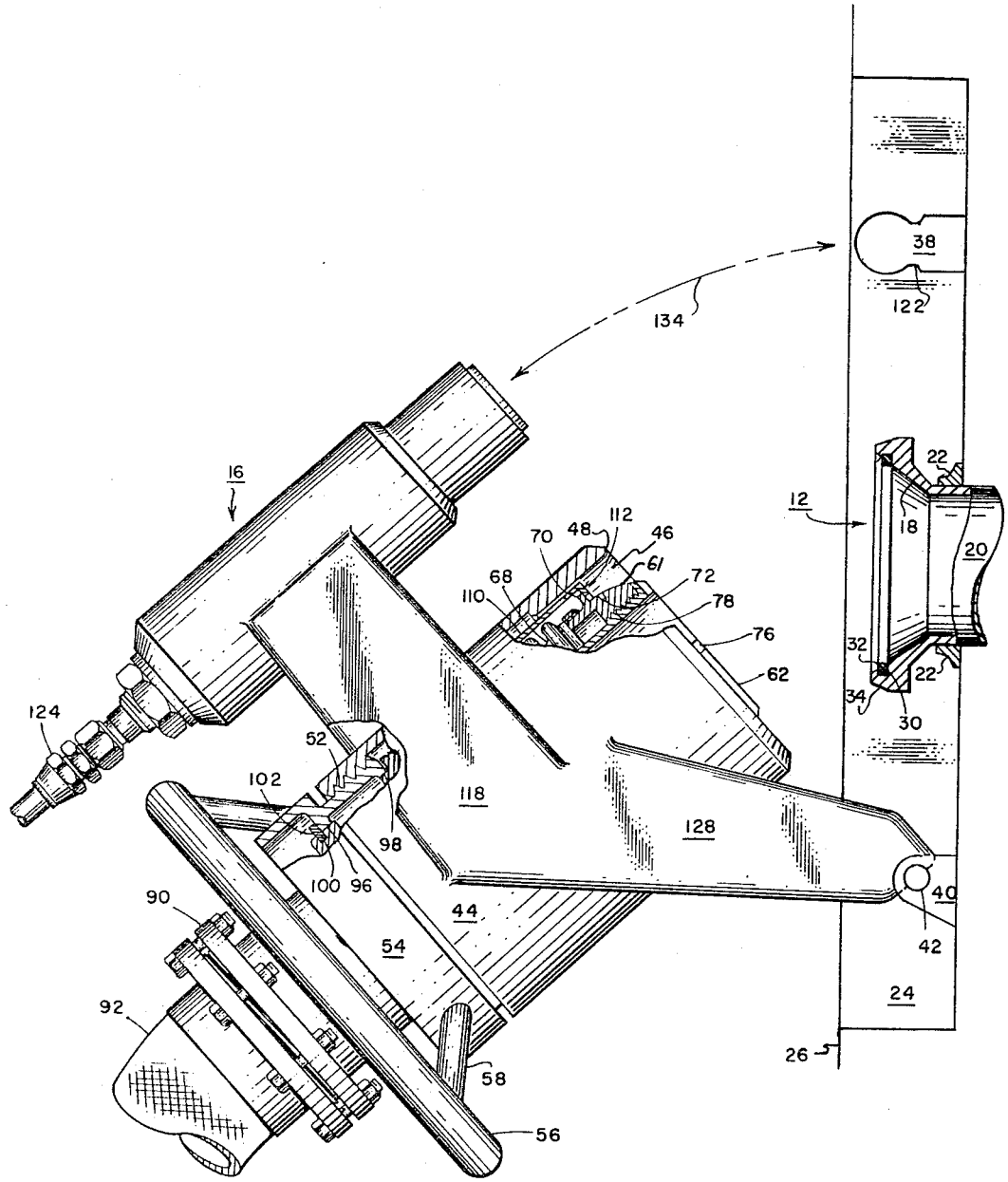
FIGURE 2 is an elevated view of the quick-release coupling illustrating both the coupling together and separation of the removable half thereof from the half attached to and carried by a launch vehicle.

The coupling 10 is quickly assembled by first placing the groove 132 over the rod 42 (in the manner shown in FIG. 2) and then raising or pivoting the male portion 14 of the coupling about the rod 42 until the securing mechanism 16 engages and locks to the rod 38. With the securing mechanism 16 so locked to the rod 38, the female portion 12 and male portion 14 are positioned in an uncoupled, axially aligned relationship. Then, the hand wheel 56 is rotated in a clockwise direction thereby moving the adapter piece 66 and bellows 68 axially forward until the spherical seal surface 62 is engaged with the ring seal 30. Fluid is now permitted to flow through the coupling 10 with the axial expanding bellows 68 supplying additional sealing pressure to the seal surface 62, ring seal 30 and conical surface 18 thus assuring that no leakage will occur. The coupling 10 will now be securely held together in a fluid tight manner until the fluid flow is stopped and the securing mechanism 16 is released by applying an actuating signal through line 124. Once the securing mechanism 16 is released the weight of the male portion 14 of the coupling 10, as well as any other forces acting to separate the two halves 12 and 14, will cause the coupling to pivot about the rod 42 and away from the female portion 12, as illustrated by broken line 134 in FIG. 2, thus dropping clear of the launch vehicle.

If desirable, the securing mechanism 16 may include a device therein for applying a release or pushing-off force to the end of the attachment rod 38. This would force the two halves 12 and 14 of the coupling 10 apart by driving the housing 44 and thus the hub 54 against the retaining ring 102. This movement would result in the lip 112 of outer sleeve 110 being pulled against the flange 70 on the spherical seal surface 62. The seal surface 62 would then be pulled away from the ring seal 30 thus effecting a break-away between the sealing surfaces without any expanding or damaging pressure being applied to the bellows 68. This feature is especially important in those instances where heavy icing conditions exist and the sealing surfaces may tend to freeze together.

Although the quick connect and release coupling has been described with the conical sealing surface 18 secured to the launch vehicle and the spherical sealing surface 62 being the half that drops away, it is to be realized that these parts are readily reversible. To do so it is only necessary that the conical sealing surface 18 be connected to the sleeve 64 and bellows 68 while the spherical sealing surface 62 is connected to the inlet pipe 20 and launch vehicle 26.

From the foregoing it will be readily apparent that a novel leak proof, quick attach and release coupling has been produced which substantially eliminates all the problems, such as proper alignment, vibration movement, icing, etc., associated with heretofore known releasable couplings. Furthermore, the coupling is inexpensive to produce, easily repaired and is readily adaptable for use with numerous fluids and under varying conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

We claim:
1. A coupling assembly adapted to convey liquified gas to a tank comprising, in combination:
   (a) a fluid carrying inlet pipe attached to said tank;
   (b) a frusto-conical shaped member attached at its small end to said inlet pipe;
   (c) a groove formed around the inner surface of said frusto-conical shaped member;
   (d) an annular seal seated in said groove;
   (e) a quick releasable securing mechanism adapted to be secured to said tank;
   (f) a housing forming a part of said quick releasable securing mechanism;
   (g) a hollow adapter means positioned within one end of said housing;
   (h) a hub rotatably mounted on said hollow adapter means and threadingly engaged with said housing;
   (i) a hollow sleeve located within said housing and having one end thereof telescopically received within one end of said hollow adapter means;
   (j) a seal ring member mounted on the other end of said hollow sleeve and having a spherical shaped outer surface adapted to engage said annular seal;
   (k) a bellow-like member surrounding said hollow sleeve and having one end thereof secured to said one end of said hollow adapter means and the other end thereof secured to said seal ring member; and
   (l) means secured to the other end of said hollow adapter means for connecting a source of liquified gas to fill said tank through said coupling assembly.

2. A coupling assembly as defined in claim 1 wherein said quick releasable securing mechanism further includes:
   (a) a downwardly projecting arm means secured to said housing;
   (b) a support pin mounted on said tank at a point below said inlet pipe;
   (c) said downwardly projecting arm means having its free end pivotally and detachably supported on said support pin;
   (d) an attachment rod mounted on said tank at a point above said inlet pipe;
   (e) a ball locking mechanism mounted on said housing and adapted to engage and lock around said attachment rod; and
   (f) a force applying means attached to and adapted for actuating said ball locking mechanism to unlock the same from said attachment rod and thereby free said downwardly projecting arm means to pivot about said support pin until said seal ring member is withdrawn from engagement with said annular seal and said housing drops away from said tank.

3. A coupling assembly as defined in claim 1 wherein said hub includes a hand wheel for rotating said hub to thereby move said seal ring member axially into seating engagement with said annular seal.

4. A coupling assembly comprising, in combination:
   (a) a first support structure supporting a first coupling portion;
   (b) a second support structure supporting a second coupling portion and pivotally secured to said first support structure;
   (c) a quick releasable mechanism for detachably securing said first and second support structures in position to initially locate said first and second coupling portions in an uncoupled, axially aligned relationship;

(d) a seating means carried by said second support structure for moving said second coupling portion axially into engagement with said first coupling portion; and (e) a bellow-like means acting between said second coupling portion and said second support structure for forcibly maintaining said second coupling portion in sealing engagement with said first coupling portion.

5. A coupling assembly as defined in claim 4 wherein said quick releasable mechanism includes:

(a) a downwardly projecting arm means secured to said second support structure;

(b) a pivotal support means mounted on said first support structure at a point below said first coupling portion;

(c) said downwardly projecting arm means having its free end pivotally and detachably supported on said pivotal support means;

(d) an attachment means mounted on said first support structure at a point above said first coupling portion; and (e) a locking means mounted on said second support structure for releasably engaging said attachment means.

References Cited by the Examiner

UNITED STATES PATENTS

| 962,075 | 6/1910 | Cash | 285—334.4 X |
|---|---|---|---|
| 2,062,806 | 12/1936 | Casler | 285—9 X |
| 2,222,746 | 11/1940 | Kamenarouic | 285—283 X |
| 2,523,995 | 9/1950 | Parmesan | 285—332.1 |
| 2,695,183 | 11/1954 | Andrew | 285—334.4 X |
| 2,923,567 | 2/1960 | Jones | 285—26 X |
| 2,971,782 | 2/1961 | Sparkman | 285—332.3 |
| 3,053,553 | 9/1962 | Browing. | |
| 3,107,107 | 10/1963 | Guarnaschelli | 285—375 |
| 3,154,326 | 10/1964 | Anding | 285—299 X |

FOREIGN PATENTS

| 478,668 | 11/1951 | Canada. |
|---|---|---|
| 959,432 | 6/1964 | Great Britain. |

CARL W. TOMLIN, *Primary Examiner.*

R. G. BERKLEY, R. GIANGIORGI, *Assistant Examiners.*